(12) United States Patent
Shetterly et al.

(10) Patent No.: US 6,513,348 B2
(45) Date of Patent: Feb. 4, 2003

(54) QUENCH STATION AND METHOD FOR QUENCHING FORMED GLASS SHEETS

(75) Inventors: Donivan M. Shetterly, Rudolph, OH (US); Terry A. Bennett, Northwood, OH (US); Daniel G. Common, Oregon, OH (US)

(73) Assignee: Glasstech, Inc., Perrysburg, OH (US)

( * ) Notice: Subject to any disclaimer, the term of this patent is extended or adjusted under 35 U.S.C. 154(b) by 43 days.

(21) Appl. No.: 09/884,843

(22) Filed: Jun. 19, 2001

(65) Prior Publication Data

US 2002/0189289 A1 Dec. 19, 2002

(51) Int. Cl.$^7$ ............................................. C03B 27/048
(52) U.S. Cl. ............................ 65/104; 65/114; 65/119; 65/182.2; 65/351
(58) Field of Search .......................... 65/104, 114, 119, 65/182.2, 351

(56) References Cited

U.S. PATENT DOCUMENTS

| | | | |
|---|---|---|---|
| 2,026,165 A | * 12/1935 | Goodwillie | ............... 65/114 |
| 2,042,521 A | * 6/1936 | Ford, Jr. | .................. 266/251 |
| 3,615,338 A | 10/1971 | Boyles | |
| 3,700,425 A | * 10/1972 | McMaster | ................. 65/348 |
| 3,881,906 A | 5/1975 | Ritter, Jr. et al. | |
| 3,951,634 A | 4/1976 | Hall et al. | |
| 4,119,427 A | 10/1978 | Revells | |
| 4,139,359 A | 2/1979 | Johnson et al. | |
| 4,218,232 A | 8/1980 | Wilhelm | |
| 4,226,608 A | 10/1980 | McKelvey | |
| 4,230,474 A | * 10/1980 | Roth et al. | .................. 65/114 |
| 4,236,907 A | 12/1980 | Mairlot | |
| 4,305,746 A | 12/1981 | Hagedorn et al. | |
| 4,312,661 A | 1/1982 | Hagedorn et al. | |
| 4,361,432 A | 11/1982 | McMaster et al. | |
| 4,368,065 A | * 1/1983 | Frank | .......................... 65/111 |
| 4,396,410 A | 8/1983 | Hagedorn et al. | |
| 4,433,993 A | * 2/1984 | Frank | .......................... 65/104 |
| 4,470,838 A | * 9/1984 | McMaster et al. | ............ 65/348 |
| 4,493,724 A | 1/1985 | Schwarzenberg et al. | |
| 4,496,386 A | 1/1985 | Hymore et al. | |
| 4,508,556 A | 4/1985 | Bennett et al. | |
| 4,540,426 A | 9/1985 | Bocelli et al. | |
| 4,556,406 A | 12/1985 | Kahle | |
| 4,557,745 A | 12/1985 | Halberschmidt et al. | |
| 4,586,946 A | 5/1986 | Kramer et al. | |
| 4,711,655 A | * 12/1987 | Schultz | ........................ 65/114 |
| 4,872,898 A | 10/1989 | Enk et al. | |
| 4,992,088 A | 2/1991 | Sassanelli et al. | |
| 5,009,693 A | 4/1991 | Freidel et al. | |
| 5,246,477 A | 9/1993 | Kramer | |
| 5,292,356 A | 3/1994 | Herrington et al. | |
| 5,368,625 A | 11/1994 | Mizusugi | |
| 5,545,245 A | 8/1996 | Mizusugi | |
| 5,656,055 A | 8/1997 | Frank et al. | |
| 5,695,538 A | 12/1997 | Goolsbay et al. | |
| 5,735,922 A | 4/1998 | Woodward et al. | |
| 5,833,729 A | 11/1998 | Meunier et al. | |
| 5,846,281 A | * 12/1998 | Nikander et al. | ............. 65/114 |
| 5,849,056 A | 12/1998 | May et al. | |
| 5,992,180 A | 11/1999 | Tsuchiya et al. | |

FOREIGN PATENT DOCUMENTS

FR    2 221 409    10/1974

* cited by examiner

*Primary Examiner*—Sean Vincent
(74) *Attorney, Agent, or Firm*—Brooks & Kushman P.C.

(57) ABSTRACT

A glass sheet quench station (16) includes first and second quench sections (24 and 26) that cooperate with a three position shuttle (28) and a control (30) to transfer glass sheets through the quench station with partial quenching performed at the first quench station and completion of the quenching at the second quench section. This glass sheet quenching method with two stage quenching shortens the cycle time to provide increased production.

14 Claims, 6 Drawing Sheets

QUENCH STATION AND METHOD FOR QUENCHING FORMED GLASS SHEETS

BACKGROUND OF THE INVENTION

1. Field of the Invention

This invention relates to a quench station and a method for quenching formed glass sheets in a manner that can reduce cycle time and thus increase production.

2. Background Art

Systems for forming glass sheets by heating and then quenching the glass sheets to provide toughening have cycle times whose shortening can be limited by the length of time required to perform the quenching. The quenching is performed by quenching gas that is directed to opposite surfaces of the formed glass sheet to provide a temperature differential between the surfaces and the glass center. That temperature differential must remain throughout the cooling until reaching ambient temperature or the glass will not be toughened by providing compression of its surfaces and tensioning of its center.

U.S. Pat. No. 4,361,432 McMaster et al. discloses glass sheet quenching between lower and upper quench heads with the formed glass sheet on an open center ring and, upon completion of the quenching, the downwardly directed quenching gas from the upper quench head is terminated to lift the glass sheet upwardly from the open center ring against the upper quench head to permit the ring to be moved to start another cycle. A delivery ring is moved under the formed glass sheet and the downwardly directed gas is again supplied to deposit the glass sheet on the delivery ring for delivery when the next formed glass sheet is moved to between the lower and upper quench heads for the quenching.

SUMMARY OF THE INVENTION

One object of the present invention is to provide an improved quench station for quenching formed glass sheets.

In carrying out the above object, the quench station for quenching formed glass sheets in accordance with the invention includes a first quench section having lower and upper quench head assemblies for respectively supplying upwardly and downwardly directed quenching gas to a formed glass sheet therebetween to provide partial quenching of the glass sheet. Such partial quenching is insufficient without further forced cooling in addition to natural convection to prevent the loss of the glass temperature differentials that toughens the glass upon finally cooling to ambient temperature. A second quench section of the quench station has lower and upper quench head assemblies for respectively supplying upwardly and downwardly directed quenching gas to the partially quenched glass sheet upon being received therebetween to complete the quenching of the glass sheet. A shuttle of the quench station is movable in a transfer direction simultaneously with respect to a forming station where the glass sheet is formed, the first quench section and the second quench section to provide glass sheet transfer. The shuttle has three glass positions so as to be capable of simultaneously transferring three glass sheets upon each movement in the transfer direction. Three glass sheets are thus simultaneously moved from the forming station to the first quench section, from the first quench section to the second quench section, and from the second quench section for delivery. A control of the quench station supplies quenching gas to the upper and lower quench sections of the first and second quench sections to force the glass sheets upwardly from the shuttle against the upper quench head assemblies and permit movement of the shuttle in the opposite direction to the transfer direction in preparation from the next cycle.

The construction of the quench station includes a framework, and the lower and upper quench head assemblies of each quench section each includes a plurality of quench heads through which pressurized gas is delivered. The quench heads of each quench head assembly are adjustable with respect to each other to permit quenching of different shapes of formed glass sheets. The lower and upper quench head assemblies respectively include lower and upper templates mounted on the framework to position the quench heads thereof in the proper position for the glass sheet shape to be quenched. Adjusters of the quench station adjust the locations of the templates on the framework to properly position the quench heads. Clamps secure the templates with respect to the framework, with the clamping being provided after the adjustment provided the adjusters.

The lower and upper quench head assemblies respectively include lower and upper linkages for connecting their quench heads. Lower and upper quench head actuators respectively extend between the framework and the lower and upper quench head assemblies to provide adjusting movement of the quench heads under the control of the linkages in preparation for positioning the quench head assemblies by the lower and upper templates.

Each of the upper quench head assemblies includes thermally insulative stops against which the glass sheets are forced upwardly by the upwardly directed quenching gases during the cyclical operation of the quench station.

Another object of the present invention is to provide an improved method for quenching formed glass sheets.

In carrying out the immediately preceding object, the method for quenching formed glass sheets in accordance with the invention is performed by moving a first formed glass sheet on a shuttle from a forming station to a first quench section having lower and upper quench head assemblies for respectively supplying upwardly and downwardly directed quenching gas to provide partial quenching thereof which is insufficient without further forced cooling in addition to natural convection to prevent loss of the glass temperature differential that toughens the glass upon finally cooling to ambient temperature. Simultaneously with the movement of the first formed glass sheet, a second partially quenched formed glass sheet is moved on the shuttle from the first quench section to a second quench section having lower and upper quench head assemblies for respectively supplying upwardly and downwardly directed quenching gas to the partially quenched glass sheet upon being received therebetween to complete the quenching of the second glass sheet. Simultaneously with the movement of the first and second glass sheets a third fully quenched glass sheet is moved from the second quench station for a final cooling to ambient temperature. The flow of the quenching gas from the lower and upper quench head assemblies of the first and second quench sections is controlled to move the formed glass sheet upwardly from the shuttle after movement thereto on the shuttle and thereby permits reverse movement of the shuttle in preparation for another cycle. Subsequently the flow of the quenching gas from the lower and upper quench head assemblies of the first and second is controlled to move the formed glass sheets downwardly onto the shuttle to permit another cycle of transferring three formed glass sheets from the forming station to the first quench section, from the first quench section to the second quench section, and from the second quench section for final cooling.

In performing the quenching method, the lower and upper quench head assemblies are respectively positioned by lower and upper templates, and the lower and upper templates are adjusted with respect to a framework of the quench sections and are clamped with respect to the framework to position the lower and upper quench head assemblies. Furthermore, the quench heads of the lower and upper quench head assemblies are respectively connected by lower and upper linkages and are moved by associated actuators for positioning in preparation for use.

During the quenching, the glass sheets are forced upwardly against thermally insulative stops of the upper quench head assemblies.

The objects, features and advantages of the present invention are readily apparent from the following detailed description of the preferred embodiment when taken in connection with the accompanying drawings.

DETAILED DESCRIPTION OF THE PREFERRED EMBODIMENTS

Figure 1:
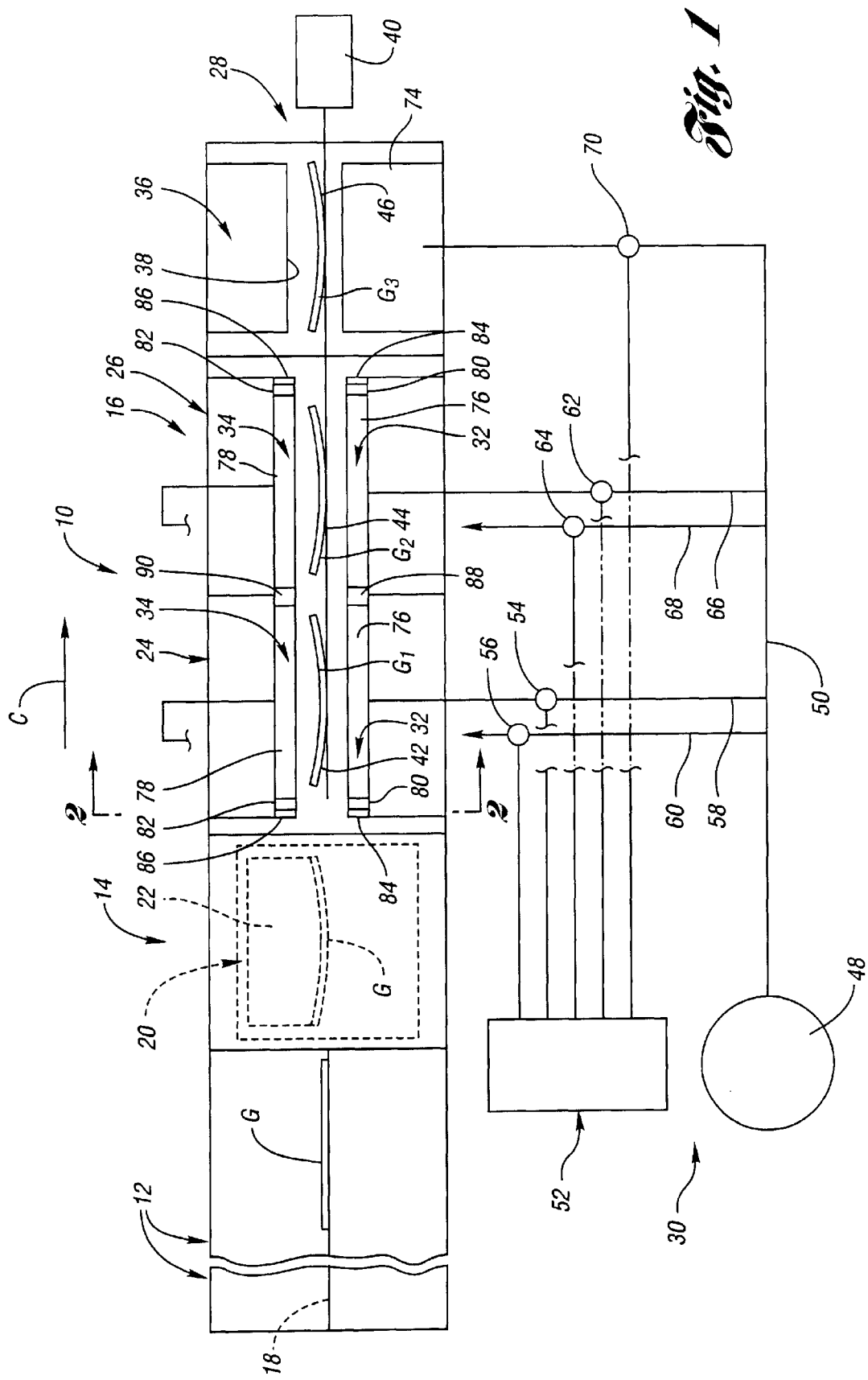
FIG. 1 is a schematic side elevational view of a glass sheet processing system including a quench station constructed in accordance with the invention to perform the quenching method of the invention.

With reference to FIG. 1, a glass sheet forming and quenching system generally indicated by 10 includes a furnace 12 for heating glass sheets, a forming station 14 for forming the heated glass sheets, and a quench station 16 that is constructed in accordance with the invention to provide the quenching method thereof as is hereinafter more fully described. The construction of the quench station 16 and its method of operation will be described in an integrated manner to facilitate an understanding of all aspects of the invention.

With continuing reference to FIG. 1, the furnace 12 of the system includes a conveyor 18 on which glass sheets G are heated within a heating chamber of the furnace to a sufficiently high temperature to permit forming and quenching of the glass. After the heating, the heated glass sheets G are transferred or conveyed in any suitable manner to the forming station 14 where forming apparatus 20 forms each heated glass sheet from a flat shape to a curved shape. After the forming, the heated glass sheet is supported as illustrated by an upper vacuum mold 22 in preparation for being transferred to the quench station 16 which, as mentioned above, is constructed in accordance with the present invention.

The quench station 16 of the invention as illustrated in FIG. 1 includes first and second quench sections 24 and 26, a shuttle 28 that simultaneously provides movement of three formed sheets $G_1$, $G_2$, and $G_3$ through the quench station as is hereinafter more fully described. In addition, the quench station also includes a control 30 that supplies quenching gas in a controlled manner which during cyclical operation moves the glass sheets upwardly from and subsequently downwardly back onto the shuttle 28 upon passage through the quench station. It should be noted that the formed glass sheets normally will have curvature in a transverse direction to the direction of conveyance through the quench station 26 and may also have curvature along the direction of conveyance as illustrated.

Figure 2:
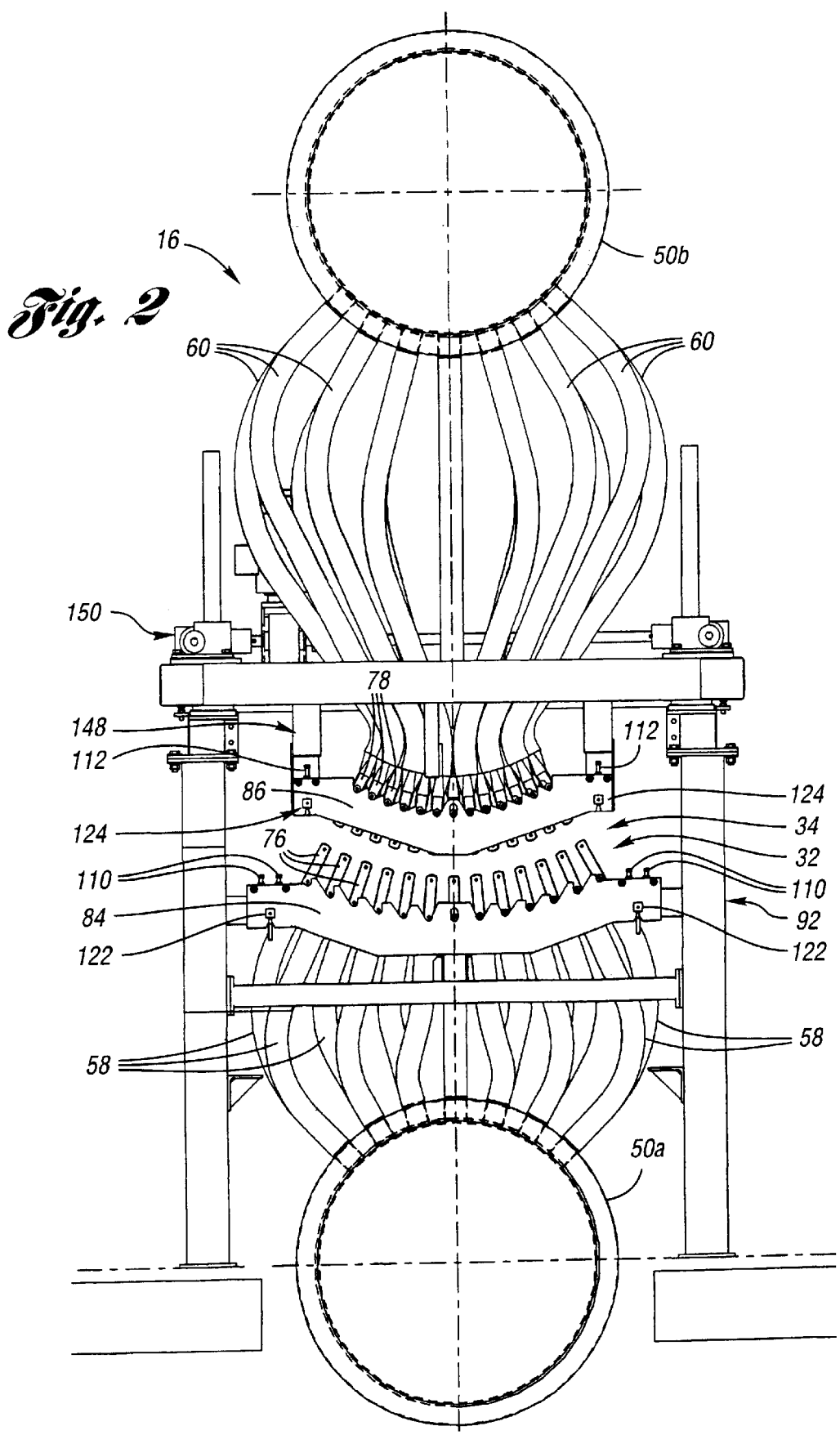
FIG. 2 is a cross sectional view taken through the quench station along the direction of line 2—2 in FIG. 1 to illustrate lower and upper quench head assemblies that respectively provide upwardly and downwardly directed quenching gas to quench a formed glass sheet therebetween.

As illustrated by FIGS. 1 and 2, the first quench section 24 has lower and upper quench head assemblies 32 and 34 for respectively supplying upwardly and downwardly directed quench gas to a formed glass sheet therebetween to provide partial quenching of the formed glass sheet. The quenching provided by the first quench section 24 is insufficient without further forced cooling in addition to natural convention to prevent loss of the glass temperature differential that toughens the glass upon final cooling to ambient temperature, either by heat strengthening or more rapid cooling that provides tempering. The second quench section 26 of the quench station also has lower and upper quench head assemblies 32 and 34 for respectively supplying upwardly and downwardly directed quenching gas to the partially quenched glass sheet upon being received therebetween during the shuttle transfer cycle described below. This quenching in the second quench station 26 completes the quenching of the glass sheet to provide heat strengthening or tempering as required by the particular manufacturing job being processed. Downstream to the right of the second quench section 26, the quench station includes an aftercooling section 36 having an upper stop 38 against which a quenched glass sheet is supported during the transfer cycle in preparation for being transferred to an unshown aftercooling conveyor and ultimate delivery from the system.

The shuttle 28 illustrated in FIG. 1 is movable along a transfer direction that corresponds with the direction conveyance C toward the right through the system and is moved by an actuator 40 so as to be simultaneously moved with respect to the forming station 14 where each glass sheet is formed, the first quench section 24, and the second quench section 26 as well as the after-cooling section 36. The shuttle 28 has three positions each of which includes an associated open ring 42, 44 and 46 for respectively supporting and transferring three glass sheets during each movement toward the right. More specifically, the shuttle 28 simultaneously moves the one glass sheet $G_1$ from the forming station 14 to the first quench section 24 as shown, the second glass sheet $G_2$ from the first quench section 24 to the second quench section 26 as shown, and the third glass sheet $G_3$ from the second quench section 26 to the after-cooling section 36 for transfer to the unshown after-cooling conveyor and ultimate delivery as previously mentioned.

As illustrated further in FIG. 1, the gas quench control 30 includes a source 48 of pressurized quenching gas that is delivered to the quench station through a main supply conduit 50. A valve controller 52 controls valves 54 and 56 that respectively control flow through delivery conduits 58 and 60 to the lower and upper quench head assemblies 32 and 34 of the first quench section 24. Valve controller 52 also controls valves 62 and 64 that control the flow of quenching gas through conduits 66 and 68 that supply the lower and upper quench head assemblies 32 and 34 of the second quench station 26. In addition, the valve controller 52 controls a valve 70 that controls the flow of quenching gas 72 to a lower blowup plenum 74 that supplies upwardly directed quench gas at the after-cooling station 36.

Each cycle of operation of the shuttle 28 illustrated in FIG. 1 is performed by moving the shuttle from the left toward the right to the position illustrated to transfer three glass sheets, one glass sheet $G_1$ from the forming station 14 to the first quench section 24, the second glass sheet $G_2$ from the first quench section 24 to the second quench section 26, and the third glass sheet $G_3$ from the second quench section 26 to the after-cooling section 36. With the shuttle positioned as shown in FIG. 1, the quenching gas is supplied under the operation of control 30 to the first and second formed glass sheets $G_1$ and $G_2$ for a sufficient time to provide the partial quenching of the first glass sheet $G_1$ and to complete the quenching of the second glass sheet $G_2$. The time involved for such quenching will depend upon the glass thickness but will normally be about 1½ to 2 seconds. The control 30 then provides a change in the force applied to the glass sheets to provide lifting thereof upwardly off of the associated shuttle rings 42, 44 and 46. Thus, the glass sheet $G_1$ is moved upwardly against the upper quench head assembly 34 of the first quench section 24, the second glass sheet $G_2$ is moved upwardly against the upper quench head assembly 34 of the second quench section 26, and the third glass sheet $G_3$ is moved upwardly against the stop 38 of the after-cooling section 36. The quenching proceeds at this time with the lower quench head assemblies 32 of both the first and second quench sections 24 and 26 continuing to supply upwardly directed quenching gas and with the upper quench head assemblies 34 continuing to supply downwardly directed quenching gas. Simultaneously, the movement of the shuttle 28 back toward the left permits commencement of another cycle as the glass sheets progress through the quench station from the left toward the right with three being moved during each shuttle movement toward the right. Prior to the commencement of each cycle, the quenching gas supplied to the first and second quench sections 24 and 26 is changed by the control 30 to release the formed glass sheets from their associated upper quench head assemblies 34 to allow the glass sheet thereof to respectively drop downwardly onto the shuttle rings 44 and 46 in preparation for respective movement from the first quench section 24 to the second quench section 26 and for movement from the second quench section 26 to the after-cooling section 36. The change in the gas flows to lift the glass sheets can be done by: (1) increasing the upward gas flow; (2) decreasing the downward gas flow; or (3) both increasing the upward gas flow and decreasing the downward gas flow.

When the glass sheets are forced upwardly against the upper quench head assemblies 34 in both the first and second quench section 24 and 26 shown in FIG. 1, the greater supply of upwardly directed quenching gas relative to the amount of downwardly directed quenching gas is offset by the fact that the glass sheets are positioned closer to the upper quench head assemblies 34 so that the cooling provided is more uniform from both the lower and upper sides.

As illustrated in FIGS. 1 and 2, the lower and upper blast head assemblies 32 and 34 each include a plurality of quench heads 76 and 78, respectively, through which quenching gas is supplied upwardly and downwardly through openings in the opposed faces of the quench heads. Furthermore, as shown in FIG. 1, the upstream ends of the lower and upper quench heads 76 and 78 are respectively connected by lower and upper linkages 80 and 82 and are positioned by lower and upper templates 84 and 86. Likewise, the downstream ends of the lower and upper quench heads 76 and 78 of the second quench section 26 are also respectively connected by lower and upper linkages 80 and 82 and are positioned by lower and upper templates 84 and 86. Furthermore, while the lower and upper quench heads 76 and 78 of the lower and upper quench head assemblies 32 and 34 of the first and second quench section 24 and 26 are fluidly isolated from each other, their respective downstream and upstream ends have mechanical lower and upper connectors 88 and 90 so as to be movable and positioned with each other in association with the lower and upper linkages 80 and 82 and the lower and upper templates 84 and 86.

As shown in FIGS. 2–5, the quench station includes a framework 92 including vertical posts 94 and horizontal beams 96 on which the lower and upper quench head assemblies 32 and 34 are mounted. Both the lower and upper linkages 80 and 82 of the lower and upper quench head assemblies have a construction best illustrated in FIG. 4 by the lower linkage which includes lower and upper link rows 98 and 99 that each include links 100 having pivotal connections 101 to the associated quench heads and to the adjacent links to provide a saw tooth shape that controls the angular positioning of the quench heads with respect to each other so the lower and upper quench heads oppose each other. The quench heads of the lower and upper quench head assemblies 32 and 34 are thus adjustable with respect to each other to permit quenching of different shapes of formed glass sheets.

Figure 3:
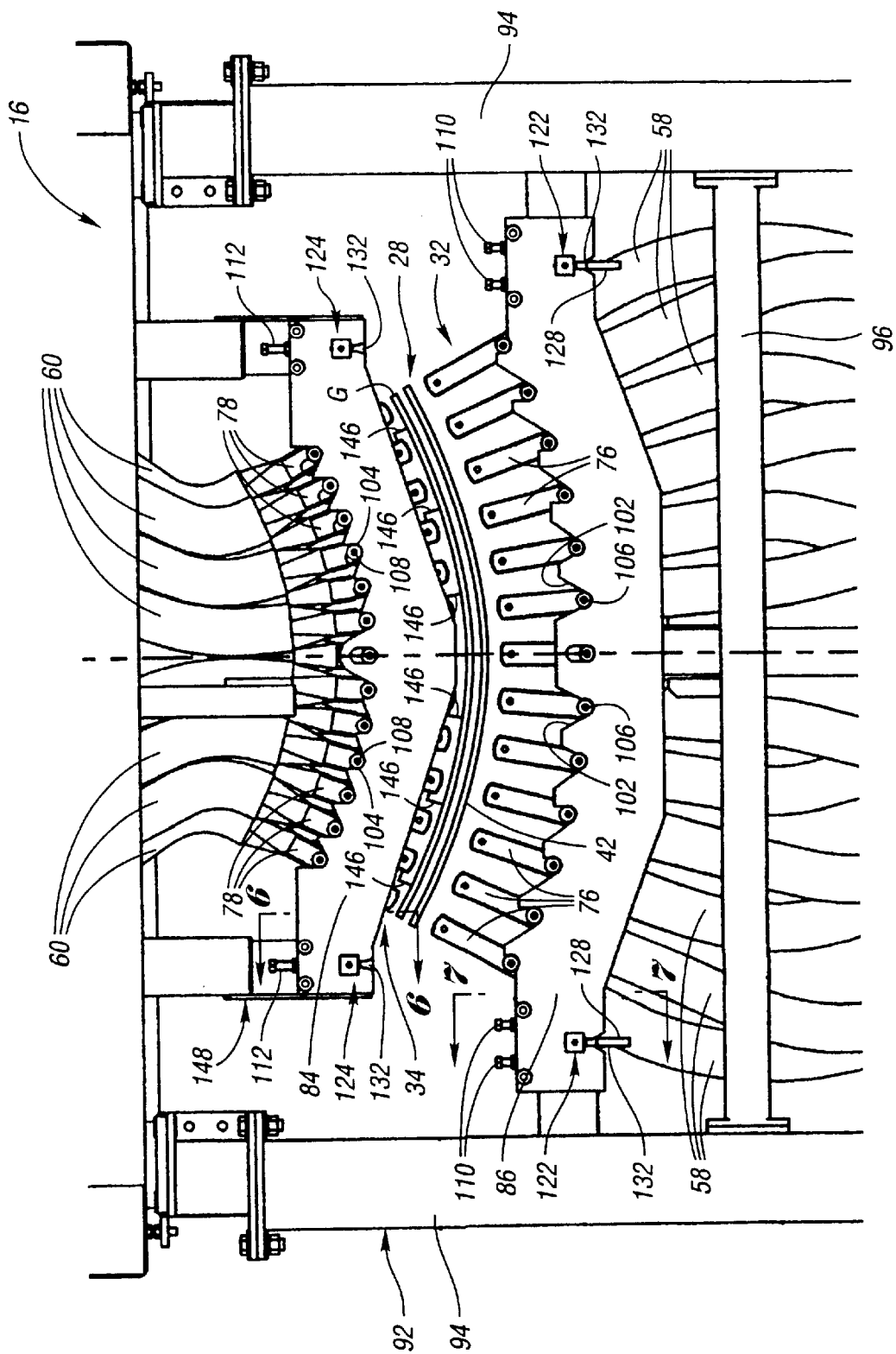
FIG. 3 is an enlarged view of a portion of FIG. 2 to further illustrate the lower and upper quench head assemblies and lower and upper templates that provide positioning of quench heads of each quench head assembly.

As shown in FIG. 3, the lower and upper templates 84 and 86 have upwardly facing positioning notches 102 and 104 that receive lower and upper positioners 106 and 108 on the adjacent ends of the lower and upper quench heads 76 and 78 to provide proper positioning of the quench heads with the associated linkages providing the proper angular location of the lower and upper quench heads with respect to each other.

As illustrated in FIG. 2, the quenching gas supply ducts $50_a$ and $50_b$ supply pressurized quenching gas to flexible lower and upper conduits 58 and 60 that respectively supply quenching gas to the lower and upper quench heads 76 and 78 of the lower and upper quench head assemblies 32 and 34.

Figure 6:
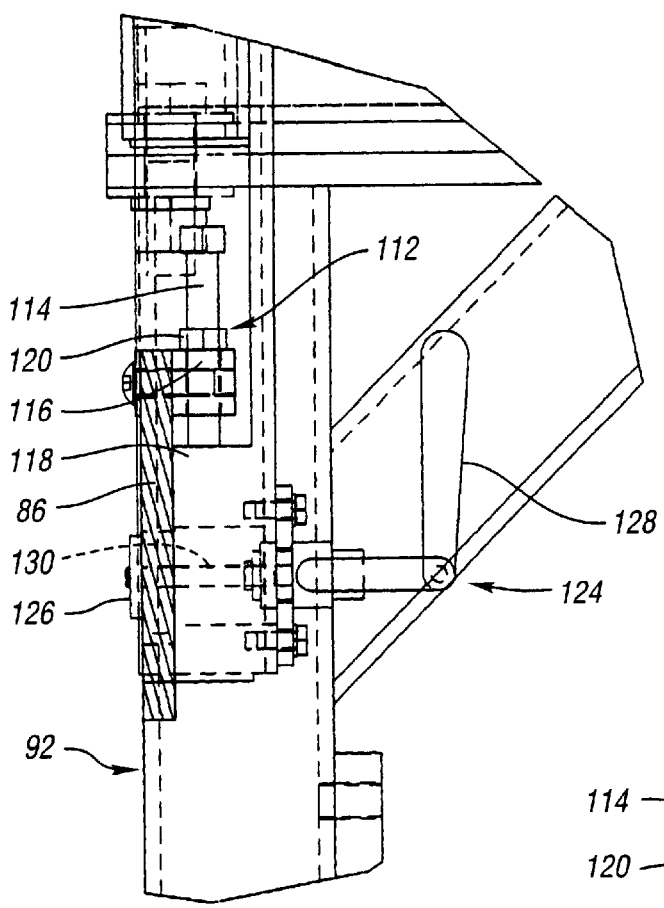
FIG. 6 is a view taken along the direction of line 6—6 in FIG. 3 to illustrate the manner in which the upper template is positioned by an adjuster and clamp to a framework of the quench station.
Figure 7:
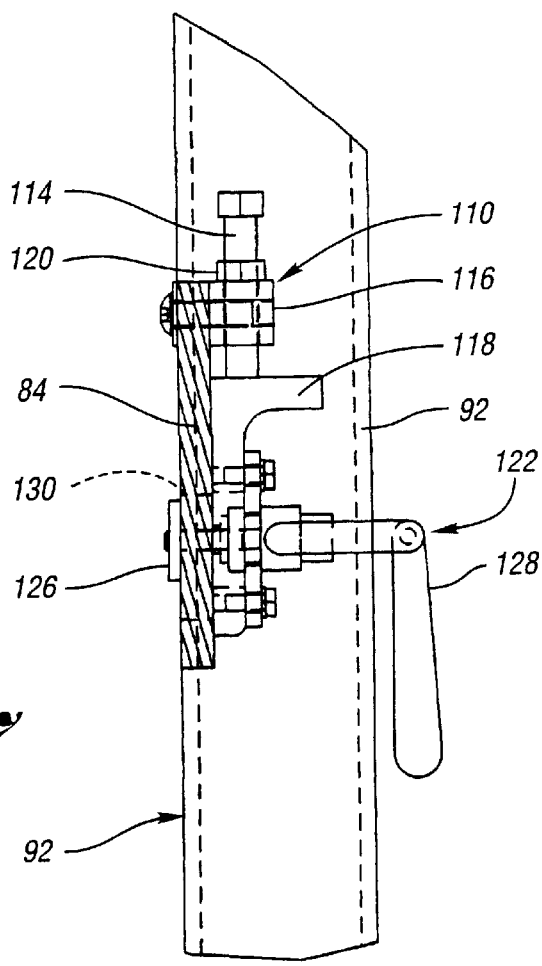
FIG. 7 is a view taken along the direction of line 7—7 in FIG. 3 to illustrate the manner in which the lower template is positioned by an adjuster and secured by a clamp to the quench station framework.

The lower and upper linkages 80 and 82 of the lower and upper quench head assemblies 32 and 34 as mentioned above ensure that the opposed faces of the lower and upper quench heads 76 and 78 are aligned with each other in order to provide uniform distribution of quenching gas to the quenched glass sheet G therebetween. Furthermore, as illustrated in FIGS. 3, 6 and 7, lower and upper adjusters 110 and 112 respectively associated with the lower and upper templates 84 and 86 provide the proper positioning of the templates on the framework 92 in order to provide the proper positioning of the lower and upper quench heads 76 and 78 in association with the angular positioning provided by the lower and upper linkages. Each adjuster 110 and 112 as shown in FIGS. 6 and 7 includes a threaded adjusting member 114 that is received by a threaded member 116 on the associated template and has a lower end engaged with a support lug 118 on the framework 92 such that threading of the adjusting member provides upward and downward movement of the template to the proper location. Upon such proper positioning, a lock nut 120 on the adjusting member 114 is threaded against the template mounted member 116 to secure the adjusted position.

As also illustrated in FIGS. 3, 6 and 7, lower and upper clamps 122 and 124 respectively associated with the lower and upper templates 84 and 86 provide clamping of the templates to the framework 92 after the adjustment provided by the lower and upper adjusters 110 and 112 as described above. As illustrated in FIGS. 6 and 7, the lower and upper clamps 122 and 124 include clamp members 126 that are operated by clamp actuators 128 in any conventional manner to clamp the associated template against the framework 92 and prevent any movement thereof after the adjustment of the templates to the proper position. Clamp connectors 130 of each clamp extend from the clamp member 126 to the clamp actuator 128 and are received within downwardly opening notches 132 (FIG. 3) in the lower side of the associated template so as to permit the upward and downward adjusting movement as necessary until the template is in the proper position for the clamping.

Figure 4:
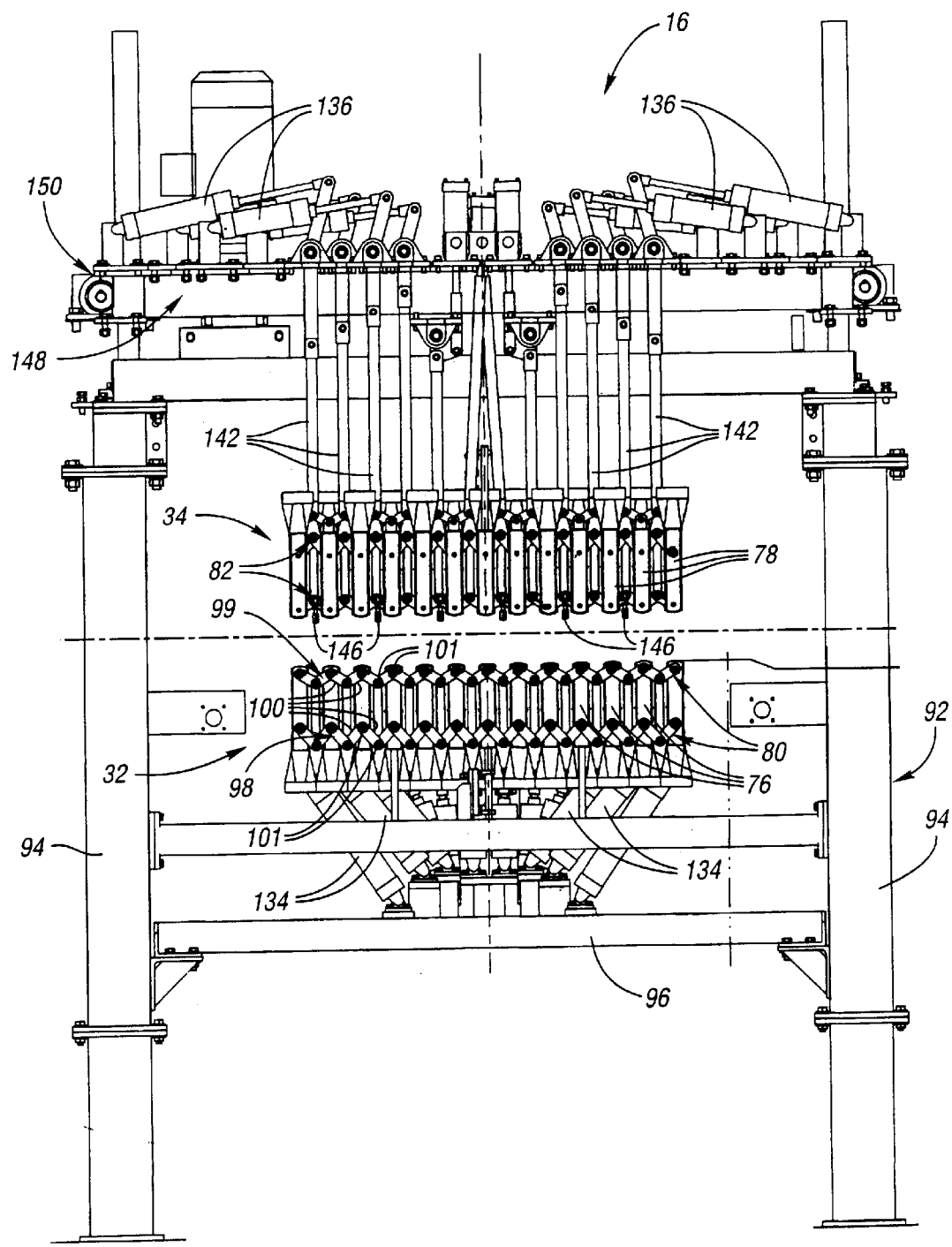
FIG. 4 is a sectional view taken through the quench station generally in the same direction as FIG. 2 but at a different location to illustrate lower and upper linkages that provide connection between the quench heads of the lower and upper quench head assemblies.

As best illustrated in FIG. 4, the lower and upper quench head assemblies include lower and upper actuators 134 and 136 that extend between the framework 92 and the lower and upper quench head assemblies 32 and 34. More specifically, each of the lower and upper quench head assemblies 32 and 34 has a center quench head 76, 78 that is fixedly positioned while the other quench heads are movable under the control of the lower and upper linkages previously described. The movement of the quench head assemblies for positioning by the templates as previously described prior to adjustment by the adjusters that were also previously described is initially provided by the lower and upper actuators 134 and 136. The lower actuators 134 have lower ends that are mounted on lower horizontal beams 96 and extend upwardly for connection to the lower quench head assembly 32 with some of the actuators having connections through links 138 and others having pivotal connections 140 connected directly to the associated lower quench heads 78. The lower actuators 134 are extendible to move the lower quench heads upwardly as required with the associated lower linkage 80 providing control of the angular position of the quench heads as they are moved.

Figure 5:
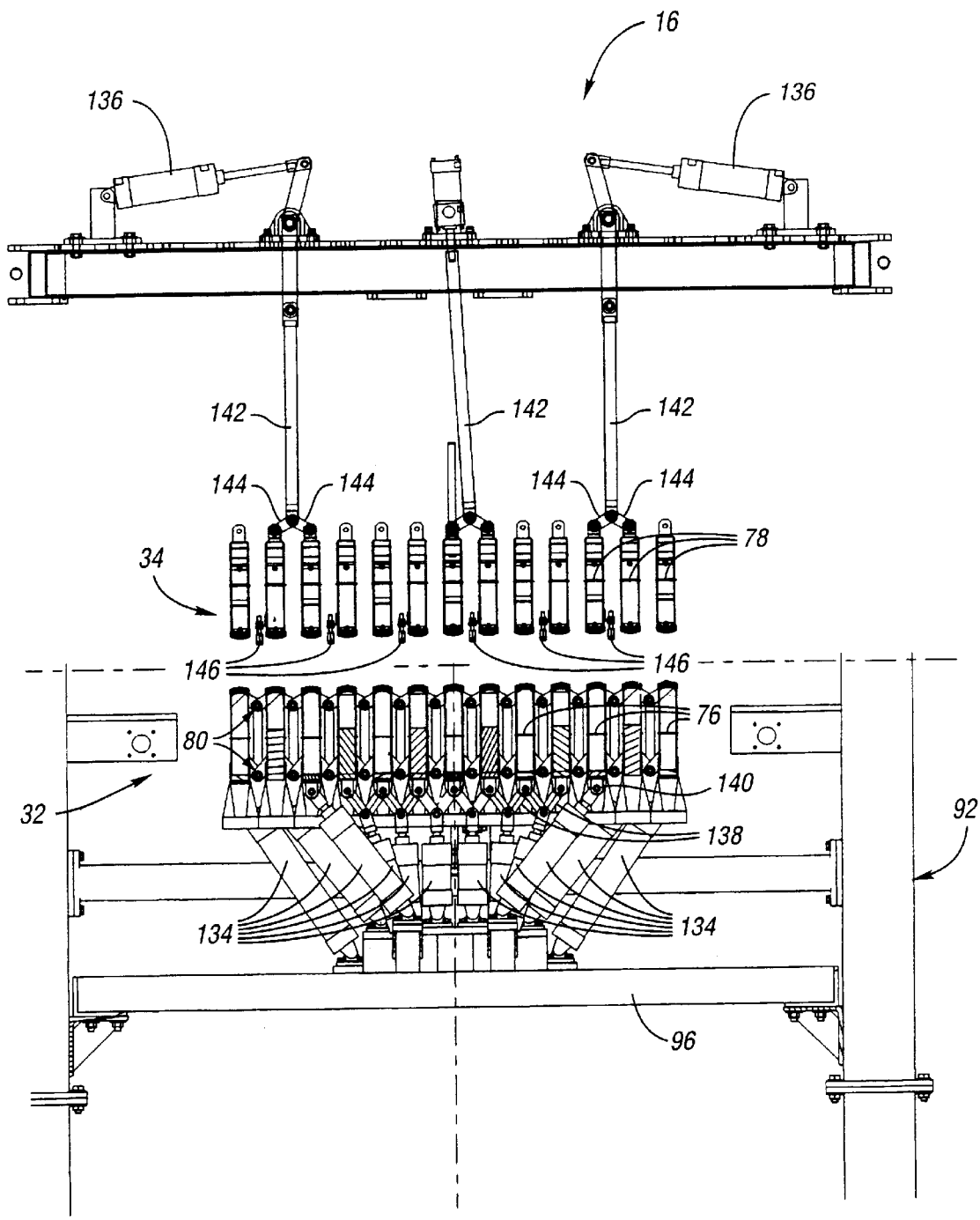
FIG. 5 is a sectional view taken in the same direction as FIG. 4 but at a different location to illustrate the manner in which actuators moves the quench heads of the lower and upper quench head assemblies in preparation for positioning thereof by the lower and upper templates illustrated in FIGS. 2 and 3.

The upper actuators 136 illustrated in FIGS. 4 and 5 are mounted on upper horizontal beams 96 of the framework 92 and have connections 142 extending downwardly to a pair of links 144 that are connected to an adjacent pair of the upper quench heads 78. These upper actuators 136 move the upper quench heads 78 under the control of these upper linkages which provide the proper angular positioning so as to oppose the lower quench heads.

As best illustrated in FIG. 5, the upper quench head assembly 34 includes thermally insulative stops 146 against which the glass sheets are forced upwardly by the quenching gas during the transferring operation as previously described. These thermally insulative stops 46 position the glass sheet and have sufficiently low thermal conductivity so as not to provide excessive conductive cooling thereof that would disrupt the uniformity in the glass cooling.

As shown in FIGS. 2 and 4, the quench station framework 92 includes an upper frame 148 that supports each upper quench head assembly 34 and has a motor driven ball screw mechanism 150 for lifting the upper frame and the upper quench head assemblies to allow broken glass removal as well as maintenance and repair.

Another system incorporating the quench station, a roll bending station that can be used to provide the glass sheet forming, and a press station that can be used to provide the glass sheet forming are respectively disclosed in United States patent applications Ser. Nos. 09/884,848; 09/884,394, and 09/884,847, which are all being filed concurrently herewith and the entire disclosures of which are hereby incorporated by reference.

While the preferred embodiment of the invention has been described, those familiar with the art to which the invention relates will recognize various alternative designs and embodiments for practicing the invention as defined by the following claims.

What is claimed is:

1. A quench station for quenching formed glass sheets comprising:

a first quench section having lower and upper quench head assemblies for respectively supplying upwardly and downwardly directed quenching gas to a formed glass sheet therebetween to provide partial quenching thereof which is insufficient without further forced cooling in addition to natural convection to prevent loss of the glass temperature differential that toughens the glass upon finally cooling to ambient temperature;

a second quench section having lower and upper quench head assemblies for respectively supplying upwardly and downwardly directed quenching gas to the partially quenched glass sheet upon being received therebetween to complete the quenching thereof;

a shuttle that is movable in a transfer direction simultaneously with respect to a forming station where the glass sheet is formed, the first quench section and the second quench section to provide glass sheet transfer, and the shuttle having three glass positions so as to be capable of simultaneously transferring three glass sheets upon each movement in the transfer direction so the three glass sheets simultaneously move from the forming station to the first quench section, from the first quench section to the second quench section, and from the second quench section for delivery; and a control that supplies quenching gas to the lower and upper quench sections of the first and second quench sections to force the glass sheets upwardly from the shuttle against the upper quench head assemblies and permit movement of the shuttle in a direction opposite to the transfer direction in preparation for the next cycle.

2. A quench station as in claim 1 which includes a framework, the lower and upper quench head assemblies of each quench section each includes a plurality of quench heads through which pressurized gas is delivered, the quench heads of each quench head assembly being adjustable with respect to each other to permit quenching of different shapes of formed glass sheets, and the lower and upper quench head assemblies respectively including lower and upper templates mounted on the framework to position the quench heads thereof in the proper position for the glass sheet shape to be quenched.

3. A quench station as in claim 2 further including adjusters that adjust the locations of the templates on the framework to properly position the quench heads.

4. A quench station as in claim 2 further including clamps that secure the templates with respect to the framework.

5. A quench station as in claim 2 further including adjusters that adjust the locations of the templates on the framework to properly position the quench heads, and clamps that secure the templates with respect to the framework after the adjustment.

6. A quench station as in claim 2 wherein the lower and upper quench head assemblies respectively include lower and upper linkages for connecting the quench heads thereof, and lower and upper quench head actuators respectively extending between the framework and the lower and upper quench head assemblies to provide adjusting movement of the quench heads under the control of the linkages in preparation for positioning of the quench head assemblies by the lower and upper templates.

7. A quench station as in claim 1 wherein each of the upper quench head assemblies includes thermally insulative stops against which the glass sheets are forced upwardly.

8. A quench station for quenching formed glass sheets comprising:
 a framework;
 a first quench section having lower and upper quench head assemblies mounted by the framework to respectively supplying upwardly and downwardly directed quenching gas to a formed glass sheet therebetween to provide partial quenching thereof which is insufficient without further forced cooling in addition to natural convection to prevent loss of the glass temperature differential that toughens the glass upon finally cooling to ambient temperature;
 a second quench section having lower and upper quench head assemblies mounted by the framework to respectively supplying upwardly and downwardly directed quenching gas to the partially quenched glass sheet upon being received therebetween to complete the quenching thereof;
 the lower and upper quench head assemblies of each quench section each including a plurality of quench heads through which pressurized gas is delivered, the lower and upper quench head assemblies respectively including lower and upper linkages for connecting the quench heads thereof, lower and upper quench head actuators respectively extending between the framework and the lower and upper quench head assemblies to provide adjusting movement of the quench heads under the control of the linkages, the lower and upper quench head assemblies respectively including lower and upper templates mounted on the framework to position the quench heads thereof in the proper position for the glass sheet shape to be quenched, adjusters for adjusting the positions of the templates on the framework, and clamps for securing the templates to the framework after their positioning adjustment by the adjusters;
 a shuttle that is movable in a transfer direction simultaneously with respect to a forming station where the glass sheet is formed, the first quench section and the second quench section to provide glass sheet transfer, and the shuttle having three glass positions so as to be capable of simultaneously transferring three glass sheets upon each movement in the transfer direction so the three glass sheets simultaneously move from the forming station to the first quench section, from the first quench section to the second quench section, and from the second quench section for delivery; and
 a control that supplies quenching gas to the upper and lower quench sections of the first and second quench sections to force the glass sheets upwardly from the shuttle against the upper quench head assemblies and permit movement of the shuttle in a direction opposite to the transfer direction in preparation for the next cycle.

9. A method for quenching formed glass sheets comprising:
 moving a first formed glass sheet on a shuttle from a forming station to a first quench section having lower and upper quench head assemblies for respectively supplying upwardly and downwardly directed quenching gas to provide partial quenching thereof which is insufficient without further forced cooling in addition to natural convection to prevent loss of the glass temperature differential that toughens the glass upon finally cooling to ambient temperature;
 simultaneously with the movement of the first glass sheet moving a second partially quenched formed glass sheet on the shuttle from the first quench section to a second quench section having lower and upper quench head assemblies for respectively supplying upwardly and downwardly directed quenching gas to the partially quenched glass sheet upon being received therebetween to complete the quenching thereof;
 simultaneously with the movement of the first and second glass sheets moving a third fully quenched glass sheet on the shuttle from the second quench section for final cooling to ambient temperature; and
 controlling the flow of quenching gas from the lower and upper quench head assemblies of the first and second quench sections to move the formed glass sheets upwardly from the shuttle after movement thereto on the shuttle and thereby permitting reverse movement of the shuttle in preparation for another cycle, and subsequently controlling the flow of quenching gas from the lower and upper quench head assemblies of the first and second quench sections to move the formed glass sheets therebetween downwardly onto the shuttle to permit another cycle of transferring three formed glass sheets from the forming station to the first quench section, from the first quench section to the second quench section, and from the second quench section for final cooling.

10. A method for quenching formed glass sheets as in claim 9 wherein the lower and upper quench head assemblies are respectively positioned by lower and upper templates.

11. A method for quenching formed glass sheets as in claim 10 wherein the lower and upper templates are adjusted with respect to a framework of the quench sections and clamped with respect thereto to position the lower and upper quench head assemblies.

12. A method for quenching formed glass sheets as in claim 9 wherein quench heads of the lower and upper quench head assemblies are respectively connected by lower and upper linkages and are moved by associated actuators for positioning in preparation for use.

13. A method for quenching formed glass sheets as in claim 9 wherein the glass sheets are forced upwardly against thermally insulative stops of the upper quench head assemblies.

14. A method for quenching formed glass sheets comprising:
 moving quench heads of lower and upper quench head assemblies of first and second quench sections with respect to a framework by actuators and associate linkages;

adjusting lower and upper templates with respect to the framework for desired positioning and clamping thereof to the framework to position the lower and upper quench head assemblies;

moving a first formed glass sheet on a shuttle from a forming station to the first quench section whose lower and upper quench head assemblies respectively supplying upwardly and downwardly directed quenching gas to provide partial quenching which is insufficient without further forced cooling in addition to natural convection to prevent loss of the glass temperature differential that toughens the glass upon finally cooling to ambient temperature;

simultaneously with the movement of the first glass sheet moving a second partially quenched formed glass sheet on the shuttle from the first quench section to the second quench section whose lower and upper quench head assemblies respectively supply upwardly and downwardly directed quenching gas to the partially quenched glass sheet upon being received therebetween to complete the quenching thereof;

simultaneously with the movement of the first and second formed glass sheets moving a third fully quenched glass sheet from the second quench section for final cooling to ambient temperature; and controlling the flow of quenching gas from the lower and upper quench head assemblies of the first and second quench sections to move the formed glass sheets upwardly from the shuttle after movement thereto on the shuttle to permit reverse movement of the shuttle in preparation for another cycle, and subsequently controlling the flow of quenching gas from the lower and upper quench head assemblies of the first and second quench heads to move the formed glass sheets therebetween downwardly onto the shuttle to permit another cycle of transferring formed glass sheets from the forming station to the first quench section, from the first quench section to the second quench section, and from the second quench section for final cooling.

* * * * *

UNITED STATES PATENT AND TRADEMARK OFFICE
CERTIFICATE OF CORRECTION

| | | |
|---|---|---|
| PATENT NO. | : 6,513,348 B2 | Page 1 of 1 |
| APPLICATION NO. | : 09/884843 | |
| DATED | : February 4, 2003 | |
| INVENTOR(S) | : Donivan M. Shetterly, Terry A. Bennett and Daniel G. Common | |

It is certified that error appears in the above-identified patent and that said Letters Patent is hereby corrected as shown below:

Column 8, Line 46, delete "sections" and replace with -- head assemblies -- .

Column 9, Line 67, delete "sections" and replace with -- head assemblies --.

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,513,348 B2 | Page 1 of 1 |
| APPLICATION NO. | : 09/884843 | |
| DATED | : February 4, 2003 | |
| INVENTOR(S) | : Donivan M. Shetterly, Terry A. Bennett and Daniel G. Common | |

It is certified that error appears in the above-identified patent and that said Letters Patent is hereby corrected as shown below:

Column 8, Line 46, delete "sections" and replace with -- head assemblies -- .

Column 9, Line 67, delete "sections" and replace with -- head assemblies --.

Signed and Sealed this

Twenty-second Day of May, 2007

JON W. DUDAS
*Director of the United States Patent and Trademark Office*